United States Patent
Margolin et al.

(10) Patent No.: US 11,797,648 B2
(45) Date of Patent: Oct. 24, 2023

(54) DEEP MAPPING FOR IMPUTING NULLS

(71) Applicant: PAYPAL, INC., San Jose, CA (US)

(72) Inventors: Itay Margolin, Pardesiya (IL); Tomer Handelman, Ramat-Gan (IL)

(73) Assignee: PayPal, Inc., San Jose, CA (US)

( * ) Notice: Subject to any disclaimer, the term of this patent is extended or adjusted under 35 U.S.C. 154(b) by 481 days.

(21) Appl. No.: 17/064,958

(22) Filed: Oct. 7, 2020

(65) Prior Publication Data

US 2022/0108137 A1    Apr. 7, 2022

(51) Int. Cl.
*G06F 16/24* (2019.01)
*G06F 18/2413* (2023.01)
*G06N 20/20* (2019.01)
*G06N 5/04* (2023.01)
*G06F 18/213* (2023.01)
*G06F 18/214* (2023.01)

(52) U.S. Cl.
CPC ...... *G06F 18/24147* (2023.01); *G06F 18/213* (2023.01); *G06F 18/2148* (2023.01); *G06N 5/04* (2013.01); *G06N 20/20* (2019.01)

(58) Field of Classification Search
CPC .................................................. G06F 16/355
See application file for complete search history.

(56) References Cited

U.S. PATENT DOCUMENTS

2019/0370347 A1*  12/2019  Levy ............ G06F 16/355

* cited by examiner

*Primary Examiner* — Baoquoc N To
(74) *Attorney, Agent, or Firm* — Haynes and Boone, LLP

(57) ABSTRACT

Methods and systems are presented for imputing missing data items within a first dataset based on data associated with a second dataset that is the nearest neighbor of the first dataset. A first mapping model is configured to map data subsets corresponding to a first data source to first positions in a multi-dimensional space. A second mapping model is configured to map data subsets corresponding to a second data source to second positions in the multi-dimensional space. The first and second mapping models are trained together to reduce a distance between positions mapped by the first and second mapping models based on corresponding data subsets that belong to the same entity. A nearest neighbor dataset to the first dataset is identified based on the first and second mapping models. Data associated with the nearest neighbor dataset is used to impute the missing data items of the first dataset.

20 Claims, 12 Drawing Sheets

| Entity | Subset I ||||||  Subset II |||||
|---|---|---|---|---|---|---|---|---|---|---|---|
|  | F1 | F2 | F3 | F4 | F5 | F6 | A | B | C | D | E |
| 1  | 0.9 | 0.3 | 0.7 | 0.9 | 0.4 | 0.9 | 0.5 | 0.1 | 0.4 | 0   | 1   |
| 3  | 0.8 | 0.5 | 1   | 0.3 | 0.1 | 0.2 | 0.8 | 0.9 | 0.4 | 0.3 | 0.2 |
| 8  | 0.4 | 0.9 | 0.1 | 0.8 | 0.2 | 0.6 | 0.7 | 0.8 | 0.9 | 0.6 | 0.4 |
| 9  | 0.4 | 0.6 | 0.5 | 0.9 | 0.4 | 0.1 | 0.3 | 0.5 | 0.8 | 0.8 | 0.6 |
| 10 | 0.2 | 0   | 0.5 | 0.4 | 0.4 | 0.9 | 0.9 | 0.1 | 0.3 | 0.7 | 0.6 |
| 11 | 0.2 | 0.2 | 0.3 | 0.1 | 0.2 | 0.7 | 0.8 | 0.3 | 0.1 | 0.9 | 0.6 |
| 12 | 0.9 | 0.1 | 0.1 | 0.3 | 0.4 | 0.9 | 0.2 | 0.9 | 0.4 | 0.2 | 0.9 |

| Entity | Set I | | | | | | Set II | | | | |
|---|---|---|---|---|---|---|---|---|---|---|---|
| | F1 | F2 | F3 | F4 | F5 | F6 | A | B | C | D | E |
| 2 | 0 | 0.2 | 0.7 | 0.8 | 0.6 | 1 | X | X | X | X | X |
| 4 | 0.9 | 0.4 | 0.8 | 0.2 | 0 | 0.6 | X | X | X | X | X |
| 5 | X | X | X | X | X | X | 0.7 | 0.8 | 1 | 0.8 | 0.4 |
| 6 | X | X | X | X | X | X | 0.1 | 0.5 | 0.1 | 0.6 | 0.8 |
| 7 | 0.2 | 0.5 | 0.5 | 0.2 | 0.7 | 0.6 | X | X | X | X | X |

Figure 4

| Entity | Set I | | | | | | Set II | | | | |
|---|---|---|---|---|---|---|---|---|---|---|---|
| | F1 | F2 | F3 | F4 | F5 | F6 | A | B | C | D | E |
| 1 | 0.9 | 0.3 | 0.7 | 0.9 | 0.4 | 0.9 | 0.5 | 0.1 | 0.4 | 0 | 1 |
| 2 | 0 | 0.2 | 0.7 | 0.8 | 0.6 | 1 | 0.9 | 0.1 | 0.3 | 0.7 | 0.6 |
| 3 | 0.8 | 0.5 | 1 | 0.3 | 0.1 | 0.2 | 0.8 | 0.9 | 0.4 | 0.3 | 0.2 |
| 8 | 0.4 | 0.9 | 0.1 | 0.8 | 0.2 | 0.6 | 0.7 | 0.8 | 0.9 | 0.6 | 0.4 |
| 9 | 0.4 | 0.6 | 0.5 | 0.9 | 0.4 | 0.1 | 0.3 | 0.5 | 0.8 | 0.8 | 0.6 |
| 10 | 0.2 | 0 | 0.5 | 0.4 | 0.4 | 0.9 | 0.9 | 0.1 | 0.3 | 0.7 | 0.6 |
| 11 | 0.2 | 0.2 | 0.3 | 0.1 | 0.2 | 0.7 | 0.8 | 0.3 | 0.1 | 0.9 | 0.6 |
| 12 | 0.9 | 0.1 | 0.1 | 0.3 | 0.4 | 0.9 | 0.2 | 0.9 | 0.4 | 0.2 | 0.9 |

Figure 7

| Entity | Set I | | | | | | Set II | | | | |
|---|---|---|---|---|---|---|---|---|---|---|---|
| | F1 | F2 | F3 | F4 | F5 | F6 | A | B | C | D | E |
| 1 | 0.9 | 0.3 | 0.7 | 0.9 | 0.4 | 0.9 | 0.5 | 0.1 | 0.4 | 0 | 1 |
| 3 | 0.8 | 0.5 | 1 | 0.3 | 0.1 | 0.2 | 0.8 | 0.9 | 0.4 | 0.3 | 0.2 |
| 5 | 0.8 | 0.5 | 1 | 0.3 | 0.1 | 0.2 | 0.7 | 0.8 | 1 | 0.8 | 0.4 |
| 8 | 0.4 | 0.9 | 0.1 | 0.8 | 0.2 | 0.6 | 0.7 | 0.8 | 0.9 | 0.6 | 0.4 |
| 9 | 0.4 | 0.6 | 0.5 | 0.9 | 0.4 | 0.1 | 0.3 | 0.5 | 0.8 | 0.8 | 0.6 |
| 10 | 0.2 | 0 | 0.5 | 0.4 | 0.4 | 0.9 | 0.9 | 0.1 | 0.3 | 0.7 | 0.6 |
| 11 | 0.2 | 0.2 | 0.3 | 0.1 | 0.2 | 0.7 | 0.8 | 0.3 | 0.1 | 0.9 | 0.6 |
| 12 | 0.9 | 0.1 | 0.1 | 0.3 | 0.4 | 0.9 | 0.2 | 0.9 | 0.4 | 0.2 | 0.9 |

Figure 9

DEEP MAPPING FOR IMPUTING NULLS

BACKGROUND

The present specification generally relates to machine learning-related improvements, and more specifically, to pre-processing data for use in a computer model to improve the performance of the computer model according to various embodiments of the disclosure.

RELATED ART

Computer-based models, such as a machine learning model, are often used by online service providers to perform analysis and predictions for its users and transactions (e.g., risk analysis/predictions, etc.) because they are capable of analyzing voluminous data and providing accurate predictions quickly, often based on patterns derived from historical data. However, the quality or accuracy of the output prediction depends in part on the amount and quality of input data provided to the computer model, as predictions based on smaller amounts of data are typically not as accurate as larger amounts of data. Likewise, predictions based on poor quality data will also be less accurate. Thus, in order to improve the performance of a computer model, an online service provider may utilize a large amount of data associated with its users and/or transactions, and often from multiple data sources.

While the inclusion of data from multiple data sources can improve the accuracy of a computer model, prediction ability suffers when incomplete sets of data are used. If data is missing that would normally be used to help train a machine learning model, an attempt can be made to "fill in" the missing data. Various ways to fill in missing data may suffer from a variety of issues, however, and result in poor quality data. Filling in missing data with "all zeros" or other null or placeholder values may be inaccurate or misleading; likewise, trying to extrapolate missing data values with averaging or other techniques may also result in inaccurate or even misleading results. Applicant recognizes there is a need for improving the performance of a computer model when a complete set of data is unavailable, and discusses techniques and structures below that relate to improved machine learning methods for when data is missing from one or more data sets.

BRIEF DESCRIPTION OF THE FIGURES

FIG. 3 illustrates example datasets that can be used by a computer-based model according to an embodiment of the present disclosure;

FIG. 4 illustrates example datasets with incomplete data according to an embodiment of the present disclosure;

FIG. 7 illustrates an example of imputing data according to an embodiment of the present disclosure;

FIG. 9 illustrates another example of imputing data according to an embodiment of the present disclosure;

Figure 1:
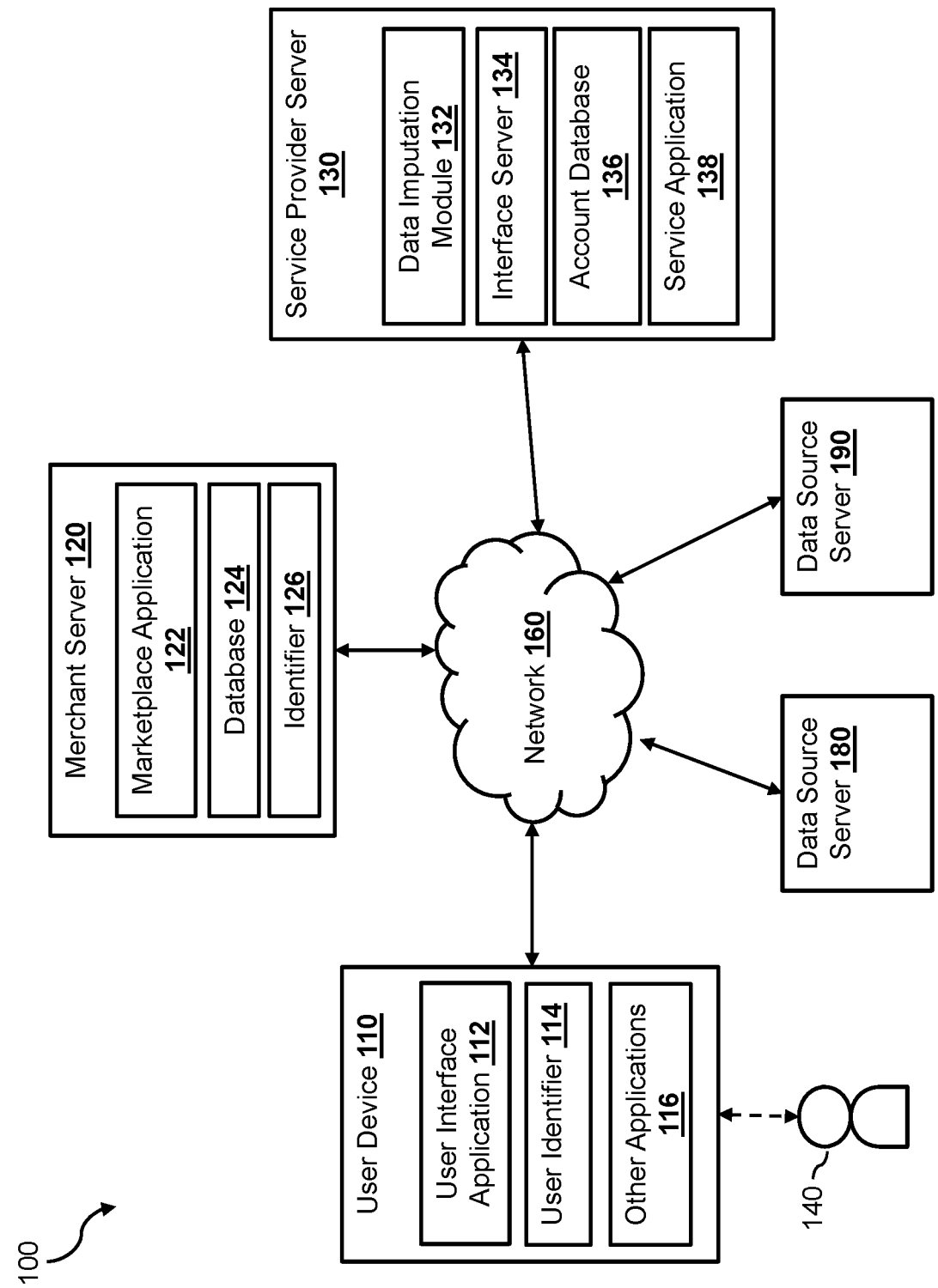
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for pre-processing data for a computer model to improve the accuracy performance of the computer model, particularly with regard to incomplete data sets. Specifically, when it is determined that a complete set of data associated with an entity (such as a user) is unavailable, the missing data may be imputed based on data associated with other entities such that a complete set of data that is realistic and representative of the entity may be provided to the computer model for performing a prediction for the entity. These techniques used to impute data represent a technical improvement in the field of machine learning. For ease of understanding, techniques are discussed below relative to users and electronic transactions in various examples; however, the techniques are generalizable and may be applied in a variety of different contexts.

As discussed above, an online service provider may obtain data associated with entities in order to perform analysis and/or prediction (e.g., risk analysis/prediction) for the entities. An entity may be an existing user or a prospective user (e.g., a user candidate) of the online service provider. The entity may be a person, a partnership, an organization, a sovereignty, etc. In one example, the online service provider may determine whether to authorize or deny an electronic transaction (e.g., a login transaction, an electronic payment transaction, an onboarding request transaction, a data access transaction, etc.) based on a predicted risk associated with the entity. In some embodiments, the online service provider may use a computer model (e.g., a machine learning model) to perform the prediction.

In order to improve the accuracy of the prediction by a computer model, the computer model may be configured to receive, as input values, a set of data (e.g., 100 data values, 500 data values, etc.) associated with an entity, such as a user, and perform a prediction based on that data. Example data that can be used for the computer model to predict a risk of a business entity, for example, may include a geographical location of the headquarters, a number of employees, an online presence, online traffic count, total revenue, a P/E ratio, product or service category offered by the entity, and other information.

The set of data may include data that is obtained from multiple different data sources. Using the example where the entity is a business, the data imputation system may obtain data, for the entity, from sources such as a credit bureau server (e.g., Experian®) and a business information server (e.g., Dun & Bradstreet™). However, when the business is not a registered business, no data of the entity would be available from the business information server. Thus, a subset of data corresponding to Dun & Bradstreet™ may be missing from the set of data associated with the first entity. When the computer model is configured to perform predictions based on an entire set of data, any missing data within the set would detrimentally affect the accuracy performance of the computer model in performing the prediction. In worst-case scenarios, the computer model would make an incorrect prediction that leads to a loss, such as financially or reputationally, to a service provider or not be able to perform the prediction at all without a complete set of data.

It is noted that the missing data need not be from a different data source as the data that is available for the entity. In some embodiments, it is possible that only a portion of data from a particular data source is available. In this case, the available data and the missing data are both from the same data source. Further, "complete" or "entire" data does not necessarily require all data associated with an entity or transaction, but rather can be limited to all data needed for the particular analysis or prediction, which can vary based on the system performing the analysis and prediction, the entity, or the transaction.

Thus, according to some embodiments of the disclosure, a data imputation system of the online service provider may impute the missing data associated with the entity in order to enable the computer model to perform a more accurate prediction for the entity than systems making predictions without the missing data. Missing data can be imputed under different approaches. For example, under a constant value approach, the data imputation system may determine an arbitrary default value (e.g., 0, 1, or any arbitrary value) for each of the data fields in the set of data. The data imputation system may automatically impute (e.g., fill-in) any missing data for the entity with the corresponding default value. While this approach of imputation is easy to implement, the resulting prediction based on the imputed data may not be accurate, as the imputed data is arbitrarily determined and is unlikely to represent the entity accurately.

In some embodiments, the data imputation system may impute missing data under an aggregation imputation approach. Under the aggregation imputation approach, instead of determining arbitrary default values for imputing data in the missing data fields, the data imputation system may obtain available values corresponding to each data field and associated with different entities, and may determine a default value for each data field based on the data associated with the different entities (e.g., a mean, a median, etc.). Although the default values determined for the data fields under the aggregation imputation approach can be better (e.g., more realistic or accurate) than the default values determined under the constant approach, the imputed data is still far from accurately representing the entity. Aggregation can also result in unrealistic data—as an example, if a data item is binary in nature like "Citizen of the United States" and has values of 0 (not a citizen) and 1 (a citizen), then using an average imputed value could result in that data item having a value of 0.4 (when in reality it should either be a 0 or a 1). Thus, both the constant value approach and the aggregation imputation approach may lead to inaccurate prediction for the entity by the computer model.

In order to impute missing data that is both realistic and accurately representative of the entity, the data imputation system of some embodiments may impute missing data under another approach—a nearest neighbor approach. Under the nearest neighbor approach, the data imputation system may impute missing data for a first entity by first identifying, from different entities, a second entity that is most similar to the first entity, and then imputing the missing data based on the data associated with the second entity. Similarity metrics may include size of the entity, volume of transactions, location of the entity, types of transactions (e.g., types of products and/or services offered), length of existence of the entity, number of locations (and sizes of the locations) of the entity, and other data as desired by the data imputation system based on the type of analysis or prediction for the entity.

In some embodiments, the data imputation system may identify the second entity from the plurality entities to be the most similar to the first entity based on the available data associated with the first entity and data associated with the second entity. For example, the first entity may be a business that has not been registered with a government agency, the data imputation system may only be able to obtain data of the first entity (e.g., a first subset of data corresponding to a first data source) from the credit bureau server, but not from the business information server (e.g., lacks a second subset of data corresponding to a second data source). On the other hand, the second entity may be a registered business, and thus a complete set of data may be obtained from the credit bureau and the business information server. In some embodiments, the data imputation system may identify the second entity, among different entities associated with the online service provider, as the most similar to the first entity based on the subset of data corresponding to the credit bureau server and associated with the first entity and the subset of data corresponding to the credit bureau server and associated with the second entity (e.g., the subset of data corresponding to the credit bureau server and associated with the first entity and the subset of data corresponding to the credit bureau server and associated with the second entity are most similar, etc.).

It can be challenging to determine which entity is most similar to the first entity. For example, when the subset of data corresponding to the credit bureau is multi-dimensional (e.g., includes a large number of different data fields) and includes data values that cannot be easily normalized (e.g., word-based values such as categories or descriptions or a product/service, multi-media item such as an image, an audio clip, a video clip, etc.), it is difficult to determine how similar (e.g., how close) or how different (e.g., how far) are two subsets of data.

According to various embodiments of the disclosure, the data imputation system may compare subsets of data associated with different entities using multiple mapping models that are configured and trained to map different subsets of data corresponding to different data sources. In some embodiments, each of the mapping models may include a machine learning model (e.g., a neural network) that is configured to map a corresponding subset of data to a position in a multi-dimensional space. Using the example where each set of data associated with an entity includes a first subset of data corresponding to a first data source (e.g., the credit bureau server) and a second subset of data corresponding to a second data source (e.g., the business information server), the data imputation system may configure a first mapping model to map the first subset of data corresponding to the first data source to a first position in the multi-dimensional space. The data imputation system may also configure a second mapping model to map the second subset of data corresponding to the second data source to a second position in the same multi-dimensional space. For example, each of the two mapping models may apply different weights to different data values within the corresponding subset of data to generate a set of coordinates representing a position within the multi-dimensional space (e.g., an (x, y) coordinate when the multi-dimensional space is a two-dimensional space).

The data imputation system may have obtained data for the different entities associated with the online service provider. The data for the different entities may be stored in different data records in a data storage (e.g., a database) associated with the online service provider. In some embodiments, the data imputation system may select data records associated with entities having multiple subsets of data (obtained data from multiple different data sources) or complete sets of data. That is, for those entities, the data imputation system was able to obtain subsets of data from multiple data sources (e.g., both of the first and second data sources). The data imputation system may then use the selected data records (having complete sets of data) to collectively train the mapping models to map the subsets of data associated with the same entity to positions (e.g., the first position and the second position) in the multi-dimensional space as close as possible. During the collective training of the mapping models, the mapping models may adjust the weights applied to the different values in the corresponding subset of data such that the mapping models may map different subsets of data that belong to the same set of data (associated with the same entity) to positions in the multi-dimensional space as close as possible (e.g., within a particular distance threshold). In other words, the mapping models are trained together to reduce the distance between positions mapped by the mapping models based on respective subsets of data that belong to the same dataset.

By training the multiple mapping models collectively to map subsets of data that are associated with the same entity to positions close with each other in the multi-dimensional space, the data imputation system may use the trained mapping models to facilitate imputation of data for an entity using subsets of data associated with a neighbor entity. For example, since the mapping models are trained to reduce (or minimize) the distance between positions mapped by the mapping models based on respective subsets of data associated with the same entity, the data imputation system may infer that if a first subset of data corresponding to the first data source and associated with the first entity is mapped by the first mapping model to a first position in the multi-dimensional space, a second subset of data (if available) corresponding to the second data source and associated with the first entity would be mapped by the second mapping model to a second position close to the first position (within a distance threshold from the first position).

Thus, in some embodiments, after training the multiple mapping models, the data imputation system may use the mapping models to map different subsets of data associated with different entities to different positions in the multi-dimensional space. Some of the entities may have multiple subsets of data (or a complete set of data in some cases), and the subsets of data may be mapped to close positions in the multi-dimensional space by the corresponding mapping models. In some embodiments, the data imputation system may use the mapped positions in the multi-dimensional space to facilitate imputation of missing data associated with some of the entities.

For example, the data imputation system may determine that that some entities (e.g., the first entity) include incomplete sets of data (e.g., missing one or more subsets of data). In a particular example, the data imputation system may determine that the first entity may include only the first subset of data corresponding to the first data source. The data imputation system may use the first mapping model to map the first subset of data to a first position in the multi-dimensional space. The data imputation system may infer that the second subset of data corresponding to the second data source and associated with the first entity would likely be mapped by the second mapping model to a second position that is close (e.g., within a distance threshold) to the first position. The data imputation system may then determine, among all of the positions in the multi-dimensional space that were mapped from different subsets of data associated with different entities by the first mapping model, a third position (e.g., a neighboring position) that is closest to the first position within the multi-dimensional space. In this example, the third position is mapped by the first mapping model from a subset of data corresponding to the first data source and associated with the second entity. The second entity may have, in addition to the subset of data corresponding to the first data source, a subset of data corresponding to the second data source (or a complete set of data).

Since the first and second mapping models are trained to map corresponding subsets of data associated with the same entity to similar positions in the multi-dimensional map, the data associated with the second entity should be most similar to the data associated with the first entity. Accordingly, the data imputation system may use the subset of data corresponding to the second data source and associated with the second entity to impute the missing data for the first entity.

In some embodiments, the data imputation system may use the data values from the subset of data corresponding to the second data source and associated with the second entity as imputation data (or replacement data) for the missing data of the first entity (e.g., as the subset of data corresponding to the second data source and associated with the first entity). Since the data values are actual data values associated with another entity (e.g., the second entity), the data values represent realistic values associated with an entity. However, it has also been contemplated that the data values can be further processed before being used as the subset of data associated with the first entity. For example, the data imputation system may calculate a distance between the first position (associated with the first entity) and the third position (associated with the second entity) in the multi-dimensional space. The data imputation system may use the distance to modify the data values in the subset of data associated with the second entity before applying the modified data values as the missing data for the first entity. For example, the data imputation system may modify each data value in the subset of data associated with the second entity in proportion to the distance such that the data imputation system may apply a larger increase or decrease to each data value based on a larger distance between the first and third positions and apply a smaller increase or decrease to each data value based on a smaller distance between the first and third positions.

Modifying the imputation values may be risky, however, because the modification may change the characteristics of the subset of data as a whole to make it less realistic or accurate. For example, if the subset of data includes a gender value (e.g., male or female) and a pregnancy value (e.g., is the person pregnant), modifying the data may change some of the values (e.g., from female to male while retaining the pregnancy value as true) to render the subset of values unrealistic, which can lead to an inaccurate prediction.

In some embodiments, instead of identifying only one position (or one other entity), the data imputation system may identify two or more positions (associated with two or more other entities) for imputing data for the first entity. For example, the data imputation system may identify two or more positions (associated with two or more other entities) in the multi-dimensional space that are closest to the first position. The data imputation system may access subsets of data corresponding to the second data source associated with the two or more entities, and may determine data values for imputing the missing data of the first entity based on the subsets of data. In some embodiments, the data imputation system may compute the data values (e.g., the imputation values) for the first entity based on the subsets of data associated with the two or more entities. For example, the data imputation system may compute, for each data field, a data value based on a function (e.g., a mean, a median, a weighted mean, etc.) of the data values corresponding to the data field and associated with the two or more entities. In one particular example, the data imputation system may compute, for each data field, a data value based on a weighted mean of the data values corresponding to the data field and associated with the two or more entities, where a weight is determined for each of the two or more entities based on a distance between the first position and a corresponding position associated with the entity.

After imputing the missing data for the first entity, the data imputation system may feed a complete set of data (including the imputed data) of the first entity to the computer model to perform a prediction for the first entity. Since the set of data of the first entity includes actual data associated with the first entity and imputed data that is realistic and representative of the first entity, the accuracy performance of the prediction by the computer model is substantially improved. The prediction may be used by the data imputation system or other system associated with the online service provider for performing processes for the first entity, for example, for authorizing or denying an electronic transaction associated with the first entity.

FIG. 1 illustrates an electronic transaction system 100, within which the data imputation system may be implemented according to one embodiment of the disclosure. Note that the present techniques may be applied in many different computing and technological environments, however, and are not limited to those shown in the figures. The electronic transaction system 100 includes a service provider server 130, a merchant server 120, data source servers 180 and 190, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online purchase transaction with the merchant server 120 via websites hosted by, or mobile applications associated with, the merchant server 120 respectively. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110. For example, the user 140 may use the input component to interact with the digital wallet application 112 (e.g., to add a new funding account, to provide information associated with the new funding account, to initiate an electronic payment transaction, etc.).

While only one user device 110 is shown in FIG. 1, it has been contemplated that multiple user devices, each associated with a different user, may be connected to the merchant server 120 and the service provider server 130 via the network 160.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

Each of the data source servers 180 and 190, in one embodiment, may be maintained by a third-party data source entity that collect, analyze, and provide access of data associated with different entities such as persons, businesses, organizations, etc. For example, the data source server 180 may be associated with a credit bureau that provides credit information (e.g., a credit score, a credit history, liability data, etc.) of entities (e.g., persons, businesses, organizations, etc.). The data source server 190 may be associated with a business information compiler such as Dun & Bradstreet that provides compiled public information of a registered business (e.g., when the business is incorporated, a status of the business, a type of entity such as an LLC, a C-corp, an S-corp, etc., a location of the Headquarters, an annual revenue, a number of employees, a liability amount, a P/E ratio, etc.). Other example entities associated with the data source server 180 or the data source server 190 may include a website analytical entity that provides website analytical data associated with an entity (e.g., traffic data, a number of content in the website, a category of the website, a ranking of traffic compared to competitors, etc.), a technology analytical entity that provides technology data used in a website associated with an entity (e.g., the type of web server used to host the website, a version of the web server, etc.), or other third-party entities other than the service provider server 130 that collects and provides access to information associated to different entities.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140 or a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a data imputation module 132 that implements the data imputation system as discussed herein. The data imputation module 132 may be coupled with one or more computer models that are configured to perform predictions for different entities, such as users (human users such as the user 140, merchant users such as a merchant associated with the merchant server 120) or user candidates who request to become a user of the service provider server 130. The predictions provided by the computer model(s) may be used by the data imputation module 132 or another module (e.g., the service application 138, the interface server 134, etc.) to process electronic transactions (e.g., login transactions, onboarding transactions, electronic payment transactions, etc.). For example, a computer model may be used to predict a risk associated with an entity (e.g., the user 140, the merchant associated with the merchant server 120, etc.), and the predicted risk may be used by the data imputation module 132 or another module to authorize or deny an electronic transaction request associated with the entity.

In some embodiments, the computer model may be configured to perform the prediction for an entity based on a set of data associated with the entity. The set of data may include data that the data imputation module 132 (or other modules associated with the service provider server 130) obtains from one or more third-party data sources, such as the data source servers 180 and 190. When data cannot be obtained from one or more of the data source servers 180 and 190 (or otherwise unavailable to the service provider server 130), the data imputation module 132 may impute the missing data using the techniques described herein.

Figure 2:
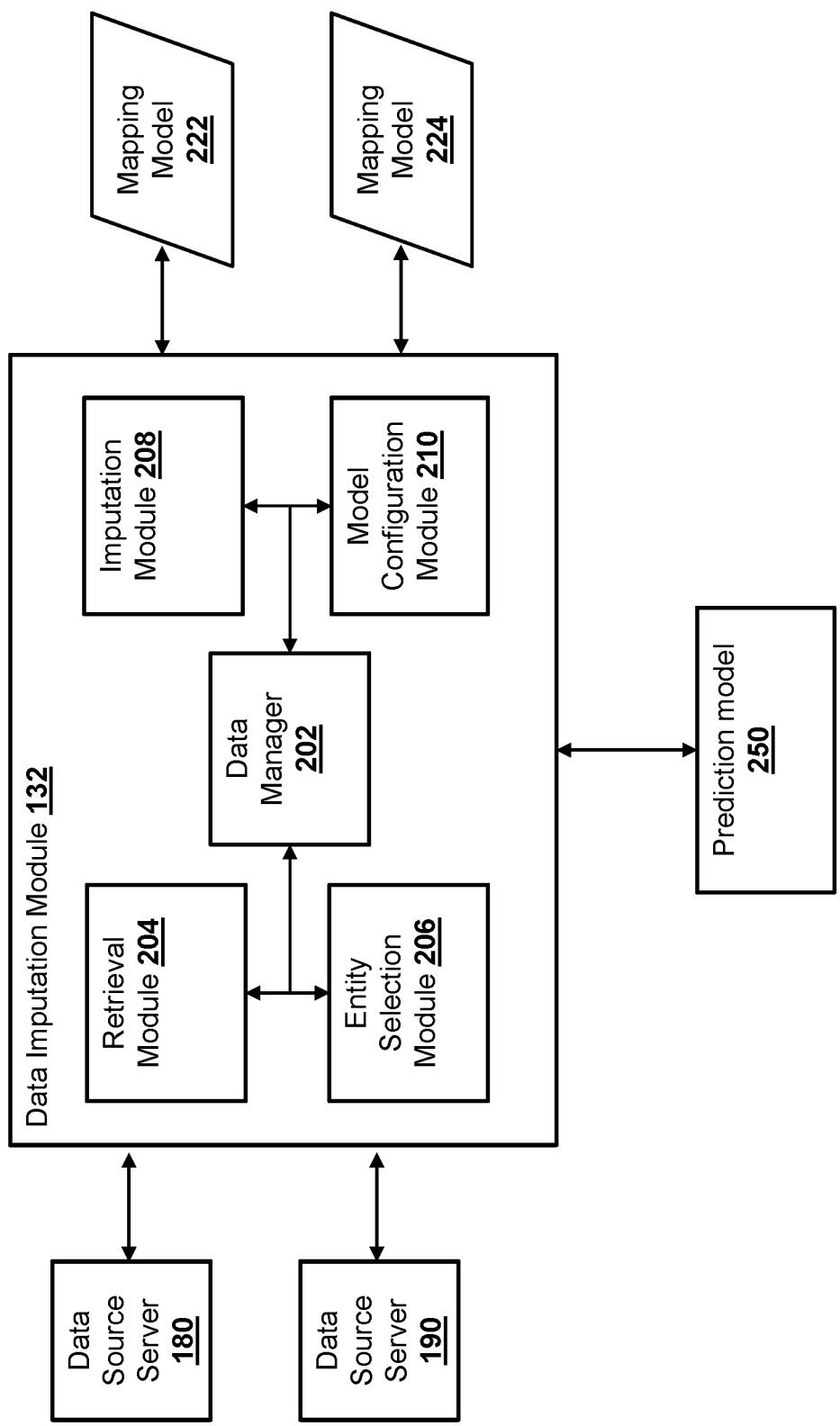
FIG. 2 is a block diagram illustrating a data imputation module according to an embodiment of the present disclosure.

FIG. 2 illustrates a block diagram of the data imputation module 132 according to an embodiment of the disclosure. The data imputation module 132 includes a data manager 202, a retrieval module 204, an entity selection module 206, an imputation module 208, and a model configuration module 210. The data imputation module 132, in some embodiments, is communicatively coupled to a prediction model 250. The prediction model 250 may be a machine learning model (e.g., a neural network, etc.) that is configured to perform predictions for different entities associated with the online service provider 130 (e.g., person users such as the user 140, merchant users such as the merchant associated with the merchant server 120, user candidates, etc.). For example, the prediction model 250 may be a machine learning model that is trained to output a risk prediction for an entity based on a set of data associated with the entity. In some embodiments, in order to improve the accuracy of the prediction by the prediction model 250, the prediction model may be configured to receive, as input values, a large set of data (e.g., 100 data values, 500 data values, etc.) associated with the entity and perform the prediction based on such a large set of data. When the prediction model 250 is configured to predict a risk associated with a person, the set of data that may be used by the prediction model 250 to perform the risk predictions may include a residential address, an age, a gender, transaction history, credit data, financial data, etc.). When the prediction model 250 is configured to predict a risk associated with a business, the set of data may be used by prediction model 250 to perform the risk predictions may include a geographical location of the headquarters, a number of employees, an online presence, online traffic count, total revenue, a P/E ratio, product or service category offered by the entity, and other information. Some of the data required by the prediction model 250 may be obtained within the service provider server 130, while some of the data may be obtained from one or more third-party data sources, such as the data source servers 180 and 190.

Thus, the retrieval module 204 may be configured to retrieve data associated with different entities associated with the service provider server 130 from the different sources, such as from the accounts database 136, the data source server 180, and/or the data source server 190. In one example, for each of the entity associated with the service provider server 130 (e.g., person users such as the user 140 or merchant users such as the merchant associated with the merchant server 120), the retrieval module 204 may retrieve a first subset of data from the data source server 180 and retrieve a second subset of data from the data source server 190. The first and second subsets of data may include different types of data that, when combined together, form a complete set of data that can be used by the prediction model 250 as input values to perform a prediction for a corresponding entity. Each of the first and second subsets of data may also include multiple data values in different formats (e.g., numerical values, categorical data in text form, description data in text form, image data, video data, audio data, etc.). In this example, the data source server 180 may be associated with a credit bureau (e.g., Experian®), and the retrieval module 204 may retrieve, for an entity, data such as a credit score, a credit history, a liability amount, etc. of the entity. The data source server 190 may be associated with a business analyzing organization (e.g., Dun & Bradstreet), and the retrieval module 204 may retrieve, for the entity, data such as a number of employees, an annual revenue, a Headquarters' address, and other information. Each of the first and second subsets of data may include a number of data (e.g., 10, 50, 100, 200 pieces of data). After retrieving the subsets of data, the retrieval module 204 may store the retrieved data for each entity in a data structure. For example, the retrieval module 204 may store the retrieved data in a table, where each record of the table includes subsets of data that are associated with a corresponding entity and obtained from the data source servers 180 and 190.

FIG. 3 illustrates an example of a data structure 300 for storing the data associated with the entities. In this example, the data structure 300 includes a table having multiple records. Each record corresponds to a particular entity associated with the service provider server 130 (e.g., a person user, a merchant user, etc.). As shown, each record in the data structure 300 includes data fields for two different subsets of data (Subset I and Subset II), corresponding to the two data sources (e.g., the data source server 180 and the data source server 190). For example, the first subset of data (Subset I) may correspond to the data obtained from the data source server 180, and may include six different data values corresponding to six data fields (e.g., F1, F2, F3, F4, F5, and F6). The second subset of data (Subset II) may correspond to the data obtained from the data source server 190, and may include five different data values corresponding to five data fields (e.g., A, B, C, D, and E). In this example, the data structure 300 includes seven records corresponding to seven entities (e.g., Entities 1, 3, 8, 9, 10, 11, and 12). After retrieving the data from the data source servers 180 and 190 for the entities, the retrieval module 204 may store the subsets of data in the corresponding records of the data structure 300. As shown, the retrieval module 204 is able to retrieve complete sets of data (data from both the data source servers 180 and 190) for the Entities 1, 3, 8, 9, 10, 11, and 12.

However, as discussed herein, a complete set of data may not be available to all entities for various reasons. For example, when an entity is not a registered business, data may not be available from the data source server 190 (e.g., Dun & Bradstreet). In such a case, the retrieval module 204 may store the data that is successfully obtained from a data source server, and may indicate the missing data that is unavailable from another data source server. FIG. 4 illustrates additional records in the data structure 300 that correspond to Entities 2, 4, 5, 6, and 7, for which the retrieval module 204 was not able to obtain complete sets of data. As indicated in the table 300, Entities 2, 4, and 7 lack subsets of data corresponding to the data source server 190, while Entities 5 and 6 lack subsets of data corresponding to the data source server 180.

When the prediction model 250 is configured to perform predictions based on an entire set of data (that includes both Subset I and Subset II corresponding to data obtained from data source servers 180 and 190), any missing data within the set would detrimentally affect the accuracy performance of the prediction model 250 in making the prediction. In two worst-case scenarios, the prediction model 250 would make a very inaccurate prediction, which can lead to the entity approving a fraudulent transaction or denying a legitimate transaction or would not be able to perform the prediction at all without a complete set of data. Thus, according to some embodiments of the disclosure, the data imputation module 132 may impute the missing data associated with an entity in order to enable the prediction model 250 to perform a more accurate prediction for the entity. In some embodiments, the data imputation module 132 may impute missing data for a first entity by first identifying, from different entities, a second entity that is most similar to the first entity, and then imputing the missing data based on the data associated with the second entity.

In some embodiments, the data imputation module 132 may use multiple mapping models that are configured to map different subsets of data corresponding to different data sources to the same multi-dimensional space to facilitate the imputation of missing data. For example, when the prediction model 250 is configured to perform predictions based on subsets of data obtained from the data source server 180 and the data source server 190, the model configuration module may generate and configure two mapping models (e.g., mapping models 222 and 224) corresponding to the data source servers 180 and 190, respectively. The model configuration module 210 may configure the mapping model 222 to determine, based on a first subset of data (e.g., the six data values in Subset I) corresponding to the data source server 180, a position within a multi-dimensional space. For example, the model configuration module 210 may configure the mapping model 222 to apply one or more algorithms or functions to convert the first subset of data into a set of coordinates that represents a position within the multi-dimensional space. When the multi-dimensional space is a two-dimensional space, the set of coordinates may include two values (e.g., an (x, y) value pair) that represents a position within the two-dimensional space. When the multi-dimensional space is a three-dimensional space, the set of coordinates may include three values (e.g., an (x, y, z) value triplet). In some embodiments, the mapping model 222 is a machine learning model (e.g., a neural network) that can be trained (e.g., continuously learn and adjust parameters within the machine learning model during the training phase) to provide the output coordinates. One benefit of implementing the mapping model 222 (and the mapping model 224) as a neural network is that the mapping model 222 can be configured to use data other than numerical data (e.g., text data, image data, audio data, etc.) as input data for determining the position within the multi-dimensional space, which can result in more accurate analysis and predictions.

Figure 5:
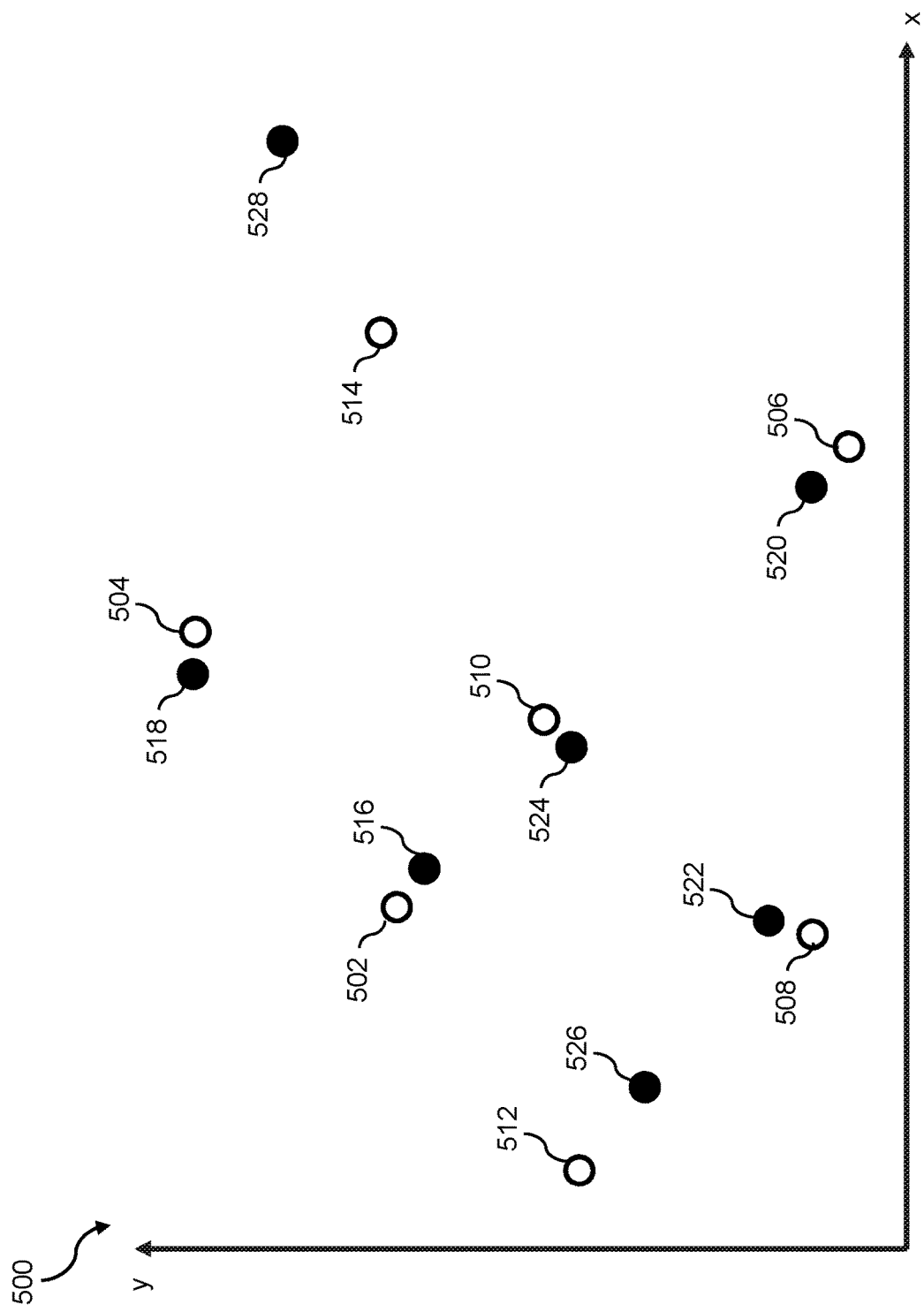
FIG. 5 illustrates positions in a multi-dimensional space mapped by mapping models based on different datasets according to an embodiment of the present disclosure.

FIG. 5 illustrates an example multi-dimensional space 500 that can be used by the model configuration module 210. In this example, the multi-dimensional space 500 is a two-dimensional space having a horizontal (x) dimension and a vertical (y) dimension. The model configuration module 210 may configure the mapping model 222 to determine a particular position in the multi-dimensional space 500 based on a subset of data obtainable from the data source server 180.

Similarly, the model configuration module 210 may generate and configure the mapping model 224 to determine, based on a second subset of data (e.g., the five data values in Subset II) corresponding to the data source server 190, a position within the multi-dimensional space 500. The mapping model 224 may be similar to the mapping model 222, except that the mapping model 224 is configured to use the second subset of data corresponding to the data source server 190, instead of the first subset of data corresponding to the data source server 180, to determine the position within the multi-dimensional space 500.

In some embodiments, the model configuration module 210 may train the mapping models 222 and 224 collectively (together), to indicate links between subsets of data that are related to each other (e.g., associated with the same entity). For example, the model configuration module 210 may train the mapping models 222 and 224 collectively such that the mapping models 222 and 224 would determine, for respective subsets of data that is are associated with the same entity, positions in the multi-dimensional space 500 close to each other (e.g., within a pre-determined distance threshold). In other words, the configuration module 210 may train the mapping models 222 and 224 collectively to reduce the distance between positions mapped by the mapping models 222 and 224 based on respective subsets of data associated with the same entity.

The model configuration module 210 may train the mapping models 222 and 224 using records in the data structure 300 that includes multiple subsets of data (e.g., records that include data from multiple data sources, such as records corresponding to Entities 1, 3, 8, 9, 10, 11, and 12). By training the mapping models 222 and 224 collectively to learn and express the links between related subsets of data (e.g., subsets of data associated with the same entity) through positions in the multi-dimensional space 500, the data imputation module 132 may facilitate imputation of missing data via the mapping models 222 and 224.

In some embodiments, the data manager 202 may identify records that include multiple subsets of data (or a complete set of data) in the data structure 300. In the example illustrated herein, the data manager 202 may identify the records corresponding to Entities 1, 3, 8, 9, 10, 11, and 12 based on the records including both subsets of data corresponding to the data source server 180 and the data source server 190. The data manager 202 may then use the trained mapping model 222 to map the subsets of data corresponding to the data source server 180 (e.g., Subset I) in the identified records to different positions in the multi-dimensional space 500. For example, the trained mapping model 222 may map the subset of data corresponding to the data source server 180 (e.g., Subset I) and associated with the Entity 1 (e.g., the subset of data comprising '0.9, 0.3, 0.7, 0.9, 0.4, 0.9') to a position 502 in the multi-dimensional space 500. Similarly, the trained mapping model 222 may map the subset of data corresponding to the data source server 180 (e.g., Subset I) and associated with the Entity 3 (e.g., the subset of data comprising '0.8, 0.5, 1, 0.3, 0.1, 0.2') to a position 504 in the multi-dimensional space 500. The trained mapping model 222 may also map the subsets of data corresponding to the data source server 180 (e.g., Subset I) and associated with the Entities 8, 9, 10, 11, and 12 to positions 506, 508, 510, 512, and 514, respectively, in the multi-dimensional space 500.

The data manager 202 may also use the trained mapping model 224 to map the subsets of data corresponding to the data source server 190 (e.g., Subset II) in the identified records to different positions in the multi-dimensional space 500. For example, the trained mapping model 224 may map the subset of data corresponding to the data source server 190 (e.g., Subset II) and associated with the Entity 1 (e.g., the subset of data comprising '0.5, 0.1, 0.4, 0, 1') to a position 516 in the multi-dimensional space 500. Similarly, the trained mapping model 224 may map the subset of data corresponding to the data source server 190 (e.g., Subset II) and associated with the Entity 3 (e.g., the subset of data comprising '0.8, 0.9, 0.4, 0.3, 0.2') to a position 518 in the multi-dimensional space 500. The trained mapping model 224 may also map the subsets of data corresponding to the data source server 190 (e.g., Subset II) and associated with the Entities 8, 9, 10, 11, and 12 to positions 520, 522, 524, 526, and 528, respectively, in the multi-dimensional space 500.

After determining positions in the multi-dimensional space 500 for the Entities 1, 3, 8, 9, 10, 11, and 12, the data manager 202 may determine data records in the data structure 300 that have missing data (e.g., have an incomplete set of data), and may impute the missing data for the data records based on other records in the data structure 300. For example, the data manager 202 may traverse the records in the data structure 300, and may identify that the records corresponding to the Entities 2, 4, 5, 6, and 7 have missing data. Specifically, the records corresponding to Entities 2, 4, and 7 lack the subset of data corresponding to the data source server 190 (e.g., Subset II), and the records corresponding to Entities 5 and 6 lack the subset of data corresponding to the data source server 180 (e.g., Subset I).

In some embodiments, to impute the missing data for a particular record corresponding to a particular entity, the data manager 202 may first use the subset of data that is available in the particular record to determine a position in the multi-dimensional space 500. The entity selection module 206 may then select one or more entities that are similar to the particular entity based on the positions associated with the entities in the multi-dimensional space 500 (e.g., positions that are mapped from subsets of data associated with the entities), and use the data associated with the one or more entities to impute the missing data for the particular entity.

Figure 6:
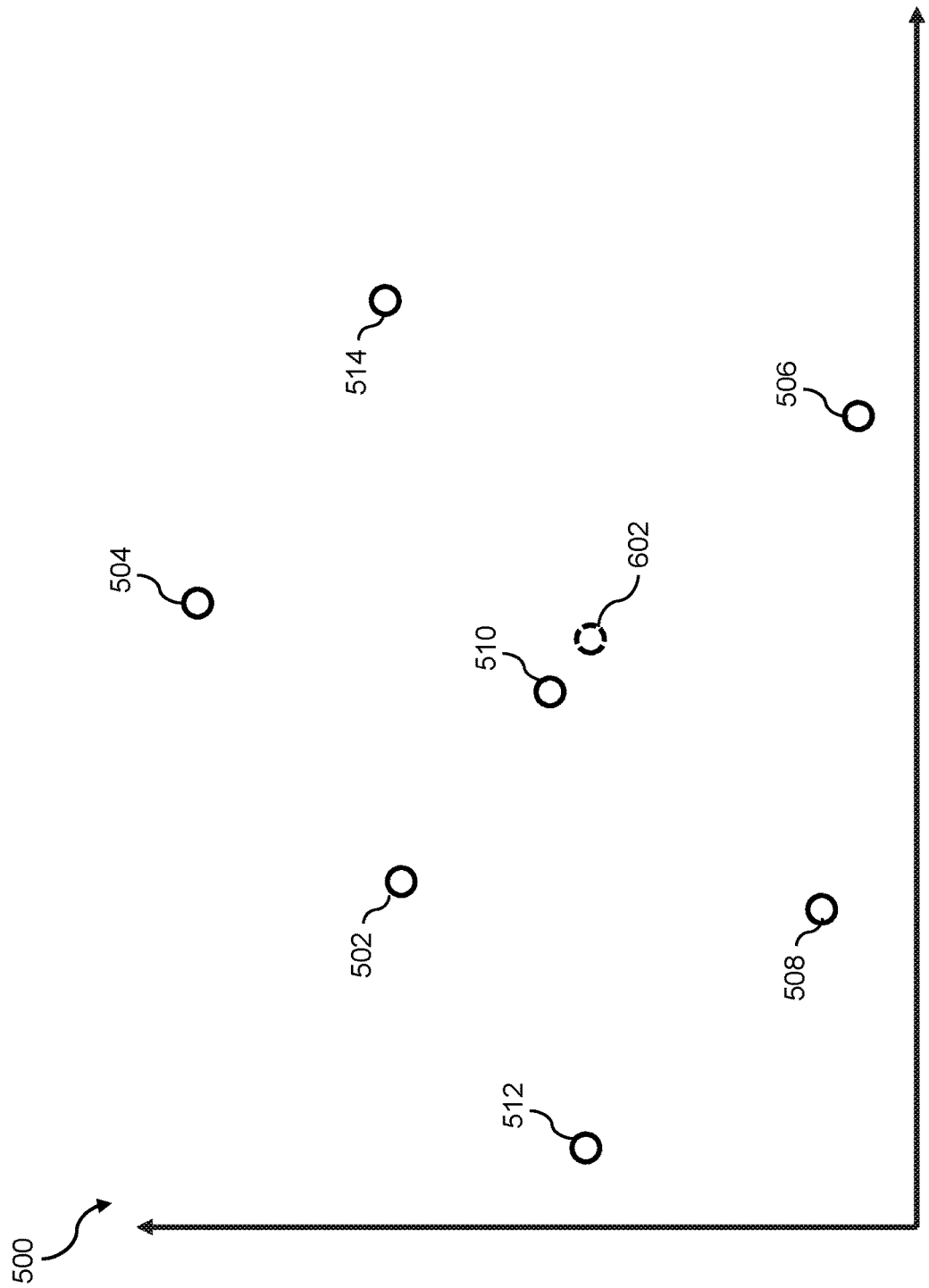
FIG. 6 illustrates an example of identifying one or more similar datasets based on positions in a multi-dimensional space mapped by mapping models according to an embodiment of the present disclosure.

For example, to impute the missing data for Entity 2, the data manager 202 may use the available data for Entity 2 (e.g., Subset I) to determine a position in the multi-dimensional space 500. Based on the available data (e.g., '0, 0.2, 0.7, 0.8, 0.6, 1') in the record corresponding to Entity 2, the data manager 202 may use the mapping model 222 to determine a position in the multi-dimensional space. In this example, the mapping model 222 maps the subset of data corresponding to the data source server 180 (e.g., '0, 0.2, 0.7, 0.8, 0.6, 1') to a position 602 in the multi-dimensional space 500, as illustrated in FIG. 6.

The entity selection module 206 may then select one or more entities that are similar to Entity 2 based on the position 602 and one or more positions associated with the other entities. For example, the entity selection module 206 may determine the positions that are mapped from subsets of data associated with the other entities (e.g., Entities 1, 3, 8, 9, 10, 11, and 12) by the same mapping model (e.g., the mapping model 222). In this example, the mapping model 222 has mapped the subsets of data (e.g., Subset I) associated with the Entities 1, 3, 8, 9, 10, and 11 to positions 502, 504, 506, 508, 510, 512, and 514, respectively. The entity selection module 206 may determine one or more entities that are similar to Entity 2 based on distances between the positions 502, 504, 506, 508, 510, 512, and 514, associated with the Entities 1, 3, 8, 9, 10, and 11, and the position 602 associated with Entity 2. Thus, in some embodiments, the entity selection module 206 may determine distances between each of the positions 502, 504, 506, 508, 510, 512, and 514, and the position 602.

In a non-limiting example, the entity selection module 206 may be configured to select one entity that is the most similar to Entity 2 based on the distances. In such an example, the entity selection module 206 may select the entity having an associated position in the multi-dimensional space 500 that has the smallest distance from the position 602. As shown in FIG. 6, the position that has the smallest distance from the position 602 is the position 510 associated with Entity 10. Therefore, the entity selection module 206 may select Entity 10 for imputing the missing data of Entity 2.

Based on the entity selection by the entity selection module 206, the imputation module 208 may impute the missing data of Entity 2 based on the data associated with Entity 10. In some embodiments, the imputation module 208 may use the same values in the subset of data corresponding to the data source server 190 (e.g., Subset II) and associated with the Entity 10 for the missing data of Entity 2. FIG. 7 shows a data structure 700 that illustrates the imputation of the missing data of Entity 2 using this approach. As shown, the subset of data (e.g., the subset of data 702) corresponding to the data source server 190 and associated with the Entity 10 is used to impute the missing subset of data 704 associated with Entity 2. In this example, identical values associated with Entity 10 are used as the imputation data for imputing (e.g., filling in) the missing data for Entity 2 (inserted into the record in the data structure 300 corresponding to Entity 2). The advantage of using identical values associated with Entity 10 for imputing the missing value for Entity 2 is that the imputed values are guaranteed to be realistic, as they are the same values associated with another entity instead of values that are made-up or arbitrarily determined. Furthermore, the imputed values are accurate for representing Entity 2 as the values that are imputed for Entity 2 come from another entity that is very similar to Entity 2.

In some embodiments, to improve the accuracy of the imputed values in representing Entity 2, the imputation module 208 may modify the data values associated with Entity 10 before using the modified data values for imputing the missing data of Entity 2. For example, the imputation module 208 may calculate a distance between the position 602 associated with Entity 2 and the position 510 associated with Entity 10 in the multi-dimensional space 500. The imputation module 208 may use the distance to modify the data values in the subset of data 702 associated with Entity 10 before applying the modified data values as the missing data for Entity 2. In one example, the imputation module 208 may modify each data value in the subset of data 702 associated with Entity 10 in proportion to the distance such that the imputation module 208 may apply a larger increase or decrease to each data value based on a larger distance between the positions 602 and 510 and apply a smaller increase or decrease to each data value based on a smaller distance between the positions 602 and 510. The imputation module 208 may then insert the modified data values to the record in the data structure 300 corresponding to Entity 2.

Figure 8:
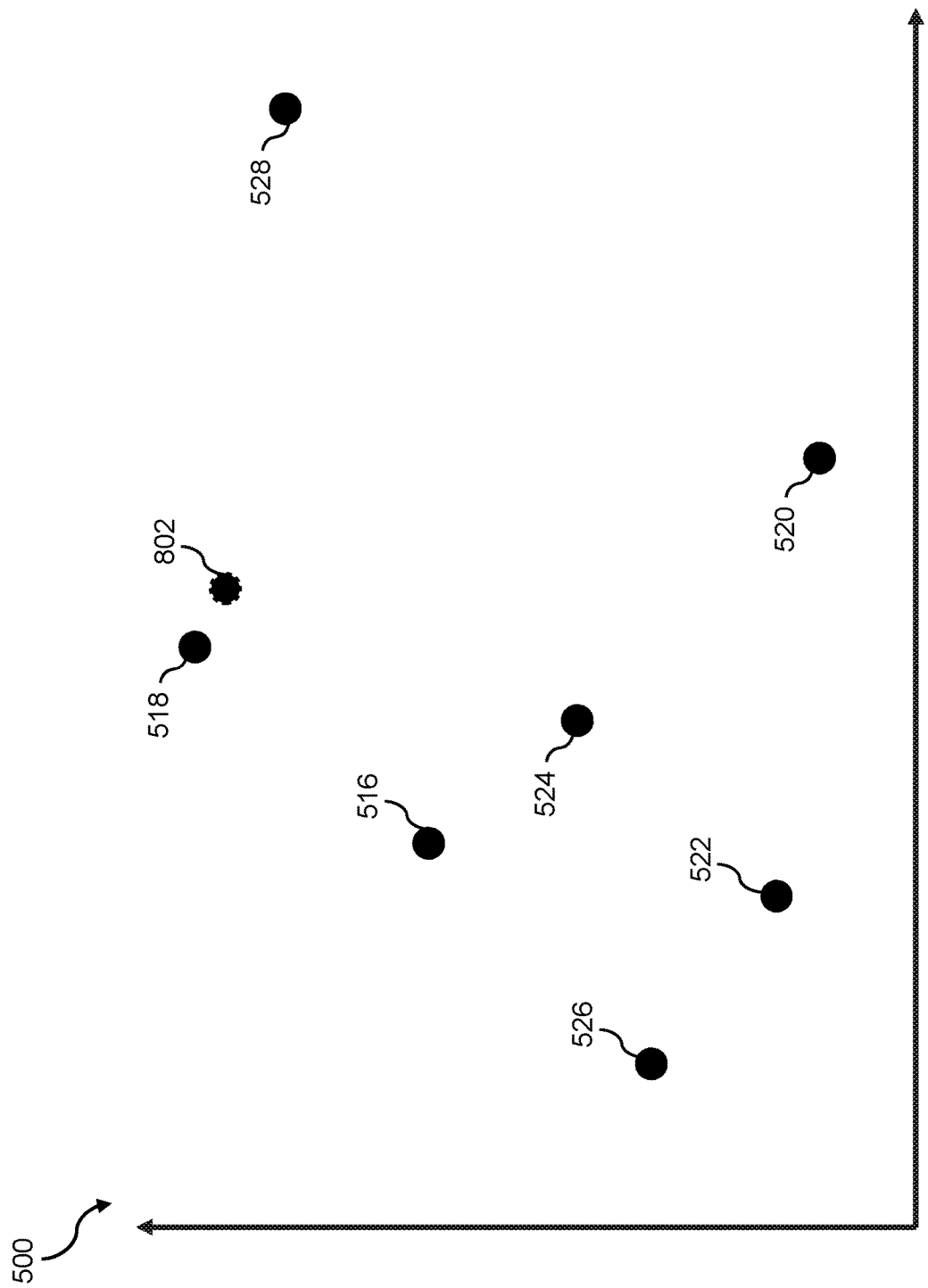
FIG. 8 illustrates another example of identifying one or more similar datasets based on positions in a multi-dimensional space mapped by mapping models according to an embodiment of the present disclosure.

After imputing the missing data of Entity 2, the data imputation module 132 may impute missing data of another entity, such as Entity 5. Unlike Entity 2, the data records corresponding to Entity 5 in the data structure 300 is shown to include a subset of data corresponding to the data source server 190 (e.g., Subset II), but lacks a subset of data (missing data) corresponding to the data source server 180 (e.g., Subset I). Thus, the data manager 202 may determine a position in the multi-dimensional space 500 for Entity 5 using the mapping model 224 based on the subset of data corresponding to the data source server 190 (e.g., Subset II). In this example, the mapping model 224 may map the subset of data including '0.7, 0.8, 1, 0.8, 0.4,' to a position 802 in the multi-dimensional space 500, as illustrated in FIG. 8.

The entity selection module 206 may then select one or more entities that are similar to Entity 5 based on the position 802 and one or more positions associated with the other entities. For example, the entity selection module 206 may determine the positions that are mapped from subsets of data associated with the other entities (e.g., Entities 1, 3, 8, 9, 10, 11, and 12) by the same mapping model (e.g., the mapping model 224). In this example, the mapping model 224 has mapped the subsets of data (e.g., Subset II) associated with the Entities 1, 3, 8, 9, 10, and 11 to positions 516, 518, 520, 522, 524, 526, and 528, respectively. The entity selection module 206 may determine one or more entities that are similar to Entity 5 based on distances between the positions 516, 518, 520, 522, 524, 526, and 528, associated with the Entities 1, 3, 8, 9, 10, and 11, and the position 802 associated with Entity 5. Thus, in some embodiments, the entity selection module 206 may determine distances between each of the positions 516, 518, 520, 522, 524, 526, and 528, and the position 602.

In a non-limiting example, the entity selection module 206 may be configured to select one entity that is the most similar to Entity 5 based on the distances. In such an example, the entity selection module 206 may select the entity having an associated position in the multi-dimensional space 500 that has the smallest distance from the position 802. As shown in FIG. 8, the position that has the smallest distance from the position 802 is the position 518 associated with Entity 3. Therefore, the entity selection module 206 may select Entity 3 for imputing the missing data of Entity 5.

Based on the entity selection by the entity selection module 206, the imputation module 208 may impute the missing data of Entity 5 based on the data associated with Entity 3. Similar to the approach used to impute the missing data for Entity 2, the imputation module 208 of some embodiments may use the same values in the subset of data corresponding to the data source server 180 (e.g., Subset I) and associated with the Entity 3 for the missing data of Entity 5. FIG. 9 illustrates the imputation of the missing data of Entity 5 using this approach. As shown, a subset of data 902 corresponding to the data source server 190 and associated with the Entity 3 is used as imputation data to impute the missing subset of data 904 associated with Entity 5. In this example, identical values associated with Entity 3 are used for the missing data for Entity 5 (inserted into the record in the data structure 300 corresponding to Entity 5).

In some embodiments, instead of identifying only one position (or one other entity), the data imputation module 132 may identify two or more positions (associated with two or more other entities) for imputing data for a particular entity. For example, to impute the missing data for Entity 2, the entity selection module 204 may identify two or more entities that are most similar to Entity 2 based on the mapped positions in the multi-dimensional space 500. Referring back to FIG. 6, in one example, the entity selection module 204 may identify three entities based on the mapped positions in the multi-dimensional space 500. The entity selection module 204 may determine distances between the positions 502, 504, 506, 508, 510, 512, and 514 and the position 602 in the multi-dimensional space 500, and may identify three positions 510, 506, and 508 (which are associated with Entities 10, 8, and 9, respectively) as closest to the position 602 based on the distances.

The imputation module 208 may then impute the missing data of Entity 2 using data associated with Entities 10, 8, and 9. In some embodiments, the imputation module 208 may compute the data values for Entity 2 based on the subsets of data (e.g., Subset II) associated with Entities 10, 8, and 9. For example, referring to FIG. 7, the imputation module 208 may compute, for each data field in the subset of data 704, a data value based on a function (e.g., a mean, a median, a weighted mean, etc.) of the data values corresponding to the data field and associated with Entities 10, 8, and 9. In one particular example, the imputation module 208 may compute, for each data field, a data value based on a weighted mean of the data values corresponding to the data field and associated with Entities 10, 8, and 9, where a weight is determined for each of Entities 10, 8, and 9 based on a distance between the position 602 in the multi-dimensional space 500 (see FIG. 6) and a corresponding position associated with the entity. In some embodiments, the weight for each entity is inversely proportional to the distance between the position 602 and the position associated with the entity. Consider an example in which the distance between the position 602 and the position 510 associated with Entity 10 is 1, the distance between the position 602 and the position 506 is 4 and the distance between the position 602 and the position 508 is 5. The imputation module 208 may determine a weight of 1 for Entity 10, a weight of ¼ for Entity 8, and a weight of ⅕ for Entity 9.

Thus, referring back to FIG. 7, for the data field 'A' in the subset of data 704 associated with Entity 2, the imputation module 208 may compute a data value by applying the weight of 1 to the corresponding data value associated with Entity 10 (0.9×1), applying the weight of ¼ to the corresponding data value associated with Entity 8 (0.7×0.25), and applying the weight of ⅕ to the corresponding data value associated with Entity 9 (0.3×0.2). The imputation module 208 may then compute the weighted mean for the data value corresponding to the data field 'A' in the subset of data 704 ((0.9×1+0.7×0.25+0.3×0.2)/(1+0.25+0.2)=0.78). The imputation module 208 may then insert the computed value (0.78) into the data field 'A' of the subset of data 704. The imputation module 208 may continue to impute the other missing data in the subset of data 704 in the same manner.

The data imputation module 132 may continue to impute missing data of other entities (e.g., Entities 4, 6, and 7) using the techniques described herein. After imputing the missing data for the entities, the data imputation module 132 may use the prediction model 250 to perform predictions for the entities. Since each of the entities has a complete set of data that is both realistic and accurate in representing the entity, the accuracy performance of the prediction model 250 in performing predictions for the entities are improved. The outcomes from the prediction model 250 (e.g., a predicted risk associated with the entity) can be used by the data imputation module 132 or another module within the service provider server 130 to process electronic transaction requests (e.g., login requests, electronic payment transaction requests, data access requests, etc.). For example, when the service provider server 130 receives an electronic transaction request associated with an entity, the data imputation module 132 or another module may authorize or deny the electronic transaction request based on the risk prediction provided by the prediction model 250 based on a complete set of data associated with the entity.

Figure 10:
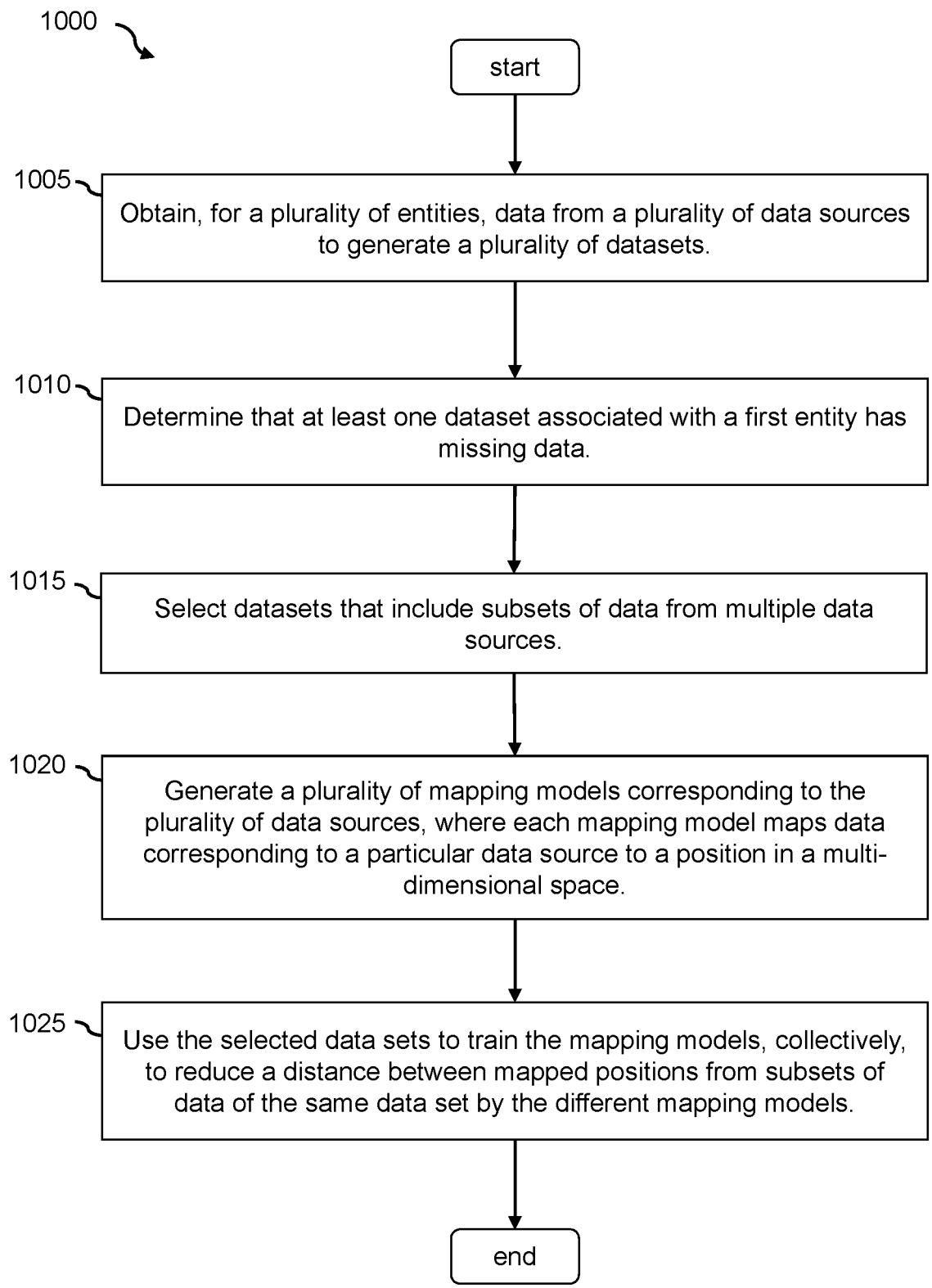
FIG. 10 is a flowchart showing a process of configuring and training mapping models according to an embodiment of the present disclosure.

FIG. 10 illustrates a process 1000 for configuring and training mapping models for mapping subsets of data to positions in a multi-dimensional space according to various embodiments of the disclosure. In some embodiments, at least a portion of the process 1000 may be performed by the data imputation module 132 of the service provider server 130. The process 1000 begins by obtaining (at 1005), for a plurality of entities, data from a plurality of data sources to generate a plurality of datasets. For example, retrieval module 204 may retrieve data from multiple data sources (e.g., the data source server 180 and the data source server 190) for entities that are associated with the service provider server 130, such as users of the service provider server 130 including Entities 1-12. The retrieval module 204 may store the retrieved data in a data structure (e.g., the data structure 300). Since the data associated with each entity may be retrieved from different data sources, some of the data may not be available to all entities. Thus, some entities may include a complete set of data while other entities may have missing data.

At step 1010, the process 1000 determines at least one dataset associated with a first entity has missing data. For example, the data manager 202 may traverse the records in the data structure 300 and may determine that the records corresponding to Entities 2, 4, 5, 6, and 7 have missing data.

The process 1000 then selects (at step 1015) datasets that include subsets of data from multiple data sources, generates (at step 1015) a plurality of mapping models corresponding to the plurality of data sources, where each mapping model maps data corresponding to a particular data source to a position in a multi-dimensional space, and uses (at step 1020) the selected data sets to train the mapping models, collectively, to reduce a distance between mapped positions from subsets of data of the same dataset by the different mapping models. For example, among the records in the data structure 300, the data manager 202 may select the records corresponding to Entities 1, 3, 8, 9, 10, 11, and 12 as those records include subsets of data obtained from multiple data source servers. The model configuration module 210 may then generates a mapping model for each data source. In this example, since the retrieval module 204 obtains data from the data source servers 180 and 190, the model configuration module 210 may generate the mapping model 222 for the data source server 180 and the mapping model 224 for the data source server 190. The model configuration module 210 may configure the mapping model 222 to map subsets of data that are obtained from the data source server 180 to positions in the multi-dimensional space 500. Similarly, the model configuration module 210 may also configure the mapping model 224 to map subsets of data that are obtained from the data source server 190 to positions in the multi-dimensional space 500. The model configuration module 210 may also use the records corresponding to Entities 1, 3, 8, 9, 10, 11, and 12 to train the mapping models 222 and 224, collectively, to reduce the distance between the positions mapped by the mapping models 222 and 224 from subsets of data associated with the same entity (e.g., from the same record).

Figure 11:
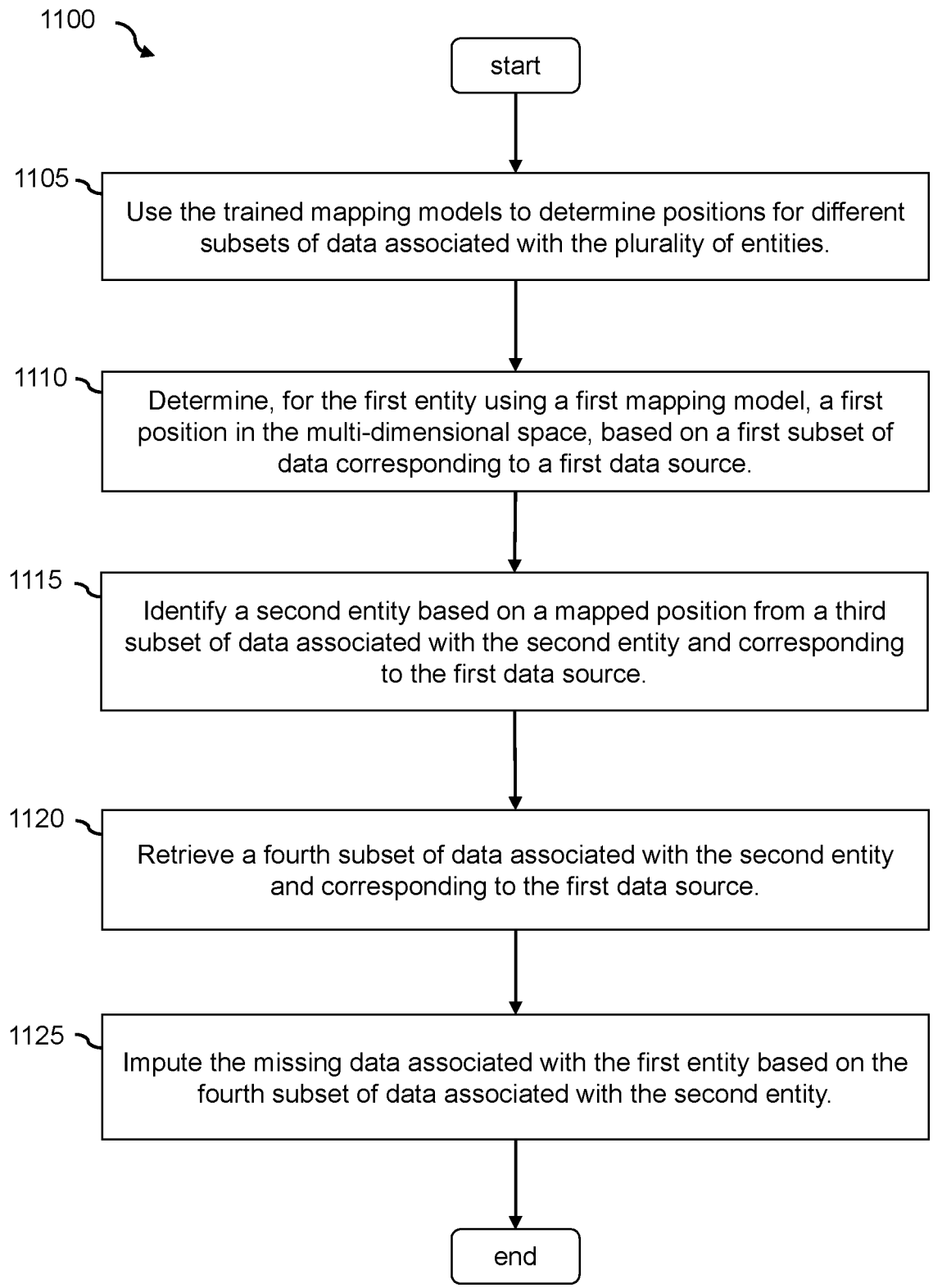
FIG. 11 is a flowchart showing a process of imputing missing data according to an embodiment of the present disclosure.

FIG. 11 illustrates a process 1100 for imputing missing data using the mapping models according to various embodiments of the disclosure. In some embodiments, at least a portion of the process 1100 may be performed by the data imputation module 132. The process 1100 begins by using (at step 1105) the trained mapping models to determine positions for different subsets of data associated with the plurality of entities. For example, the data manager 202 may use the mapping models 222 and 224 to map subsets of data associated with Entities 1, 3, 8, 9, 10, 11, and 12 to positions 502-528 in the multi-dimensional space 500.

The process 1100 then determines (at step 1110), for the first entity using a first mapping model, a first position in the multi-dimensional space, based on a first subset of data corresponding to a first data source. For example, the data manager 202 may determine that Entity 2 has missing data. Specifically, the data manager 202 may determine that the record corresponding to Entity 2 includes a subset of data corresponding to the data source server 180 (e.g., Subset I), but has missing data in the subset of data corresponding to the data source server 190 (e.g., Subset II). Thus, the data manager 202 may use the mapping model 222 to map the available data (the subset of data corresponding to the data source server 180) to the position 602 in the multi-dimensional space 500.

The process 1100 then identifies (at step 1115) a second entity based on a mapped position from a third subset of data associated with the second entity and corresponding to the first data source. For example, the entity selection module 206 may identify Entity 10 as being the most similar to Entity 2 based on the position 510 (that is mapped by the mapping model 222 from the subset of data associated with Entity 10) being closest to the position 602 in the multi-dimensional space 500.

The process 1100 then retrieves (at step 1120) a fourth subset of data associated with the second entity and corresponding to the first data source and imputes (at step 1125) the missing data associated with the first entity based on the fourth subset of data associated with the second entity. For example, the imputation module 208 may retrieve the subset of data 702 that corresponds to the data source server 190 and associated with Entity 10, and may use the subset of data 702 to impute the missing data of Entity 2. In one example, the imputation module 208 inserts the data values from the subset of data 702 directly to the data fields corresponding to the data source server 190 and associated with Entity 2.

While the examples discussed above illustrates data imputation techniques for data records the include two subsets of data (e.g., obtained from two different data sources), the same data imputation techniques can be used for data records that include more than two subsets of data (e.g., 3, 5, 10, etc.) that are obtained from more than two data sources. In this case, the model configuration module 210 may generate more than two mapping models, each for a corresponding subset of data. The data records used for training the mapping models may include multiple subsets of data (2, 3, 5 subsets of data) but may not need to include a complete dataset. The imputation module 208 may determine a record that includes an available subset of data and a missing subset of data. The imputation module 208 may impute the missing subset of data for the record based on another record that has a subset of data that corresponds to the missing subset of data and another subset of data that corresponds to the available subset of data.

Figure 12:
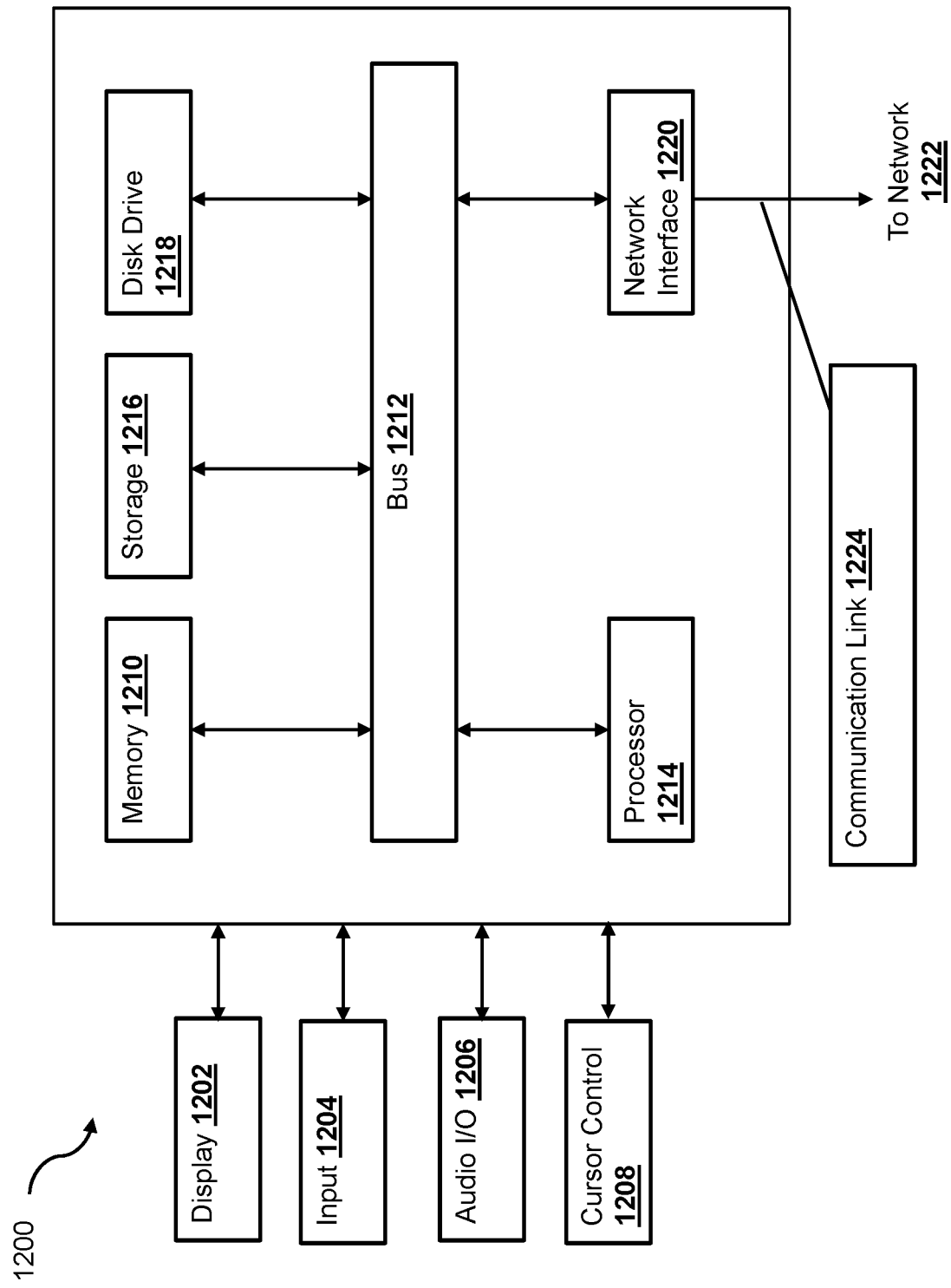
FIG. 12 is a block diagram of a system for implementing a device according to an embodiment of the present disclosure.

FIG. 12 is a block diagram of a computer system 1200 suitable for implementing one or more embodiments of the present disclosure, including the service provider server 130, the merchant server 120, the data source servers 180 and 190, and the user device 110. In various implementations, the user device 110 may include a mobile cellular phone, personal computer (PC), laptop, wearable computing device, etc. adapted for wireless communication, and each of the service provider server 130, the merchant server 120, and the data source servers 180 and 190 may include a network computing device, such as a server. Thus, it should be appreciated that the devices 110, 120, 130, 180, and 190 may be implemented as the computer system 1200 in a manner as follows.

The computer system 1200 includes a bus 1212 or other communication mechanism for communicating information data, signals, and information between various components of the computer system 1200. The components include an input/output (I/O) component 1204 that processes a user (i.e., sender, recipient, service provider) action, such as selecting keys from a keypad/keyboard, selecting one or more buttons or links, etc., and sends a corresponding signal to the bus 1212. The I/O component 1204 may also include an output component, such as a display 1202 and a cursor control 1208 (such as a keyboard, keypad, mouse, etc.). The display 1202 may be configured to present a login page for logging into a user account or a checkout page for purchasing an item from a merchant. An optional audio input/output component 1206 may also be included to allow a user to use voice for inputting information by converting audio signals. The audio I/O component 1206 may allow the user to hear audio. A transceiver or network interface 1220 transmits and receives signals between the computer system 1200 and other devices, such as another user device, a merchant server, or a service provider server via network 1222. In one embodiment, the transmission is wireless, although other transmission mediums and methods may also be suitable. A processor 1214, which can be a micro-controller, digital signal processor (DSP), or other processing component, processes these various signals, such as for display on the computer system 1200 or transmission to other devices via a communication link 1224. The processor 1214 may also control transmission of information, such as cookies or IP addresses, to other devices.

The components of the computer system 1200 also include a system memory component 1210 (e.g., RAM), a static storage component 1216 (e.g., ROM), and/or a disk drive 1218 (e.g., a solid-state drive, a hard drive). The computer system 1200 performs specific operations by the processor 1214 and other components by executing one or more sequences of instructions contained in the system memory component 1210. For example, the processor 1214 can perform the token sharing functionalities described herein according to the processes 1000 and 1100.

Logic may be encoded in a computer readable medium, which may refer to any medium that participates in providing instructions to the processor 1214 for execution. Such a medium may take many forms, including but not limited to, non-volatile media, volatile media, and transmission media. In various implementations, non-volatile media includes optical or magnetic disks, volatile media includes dynamic memory, such as the system memory component 1210, and transmission media includes coaxial cables, copper wire, and fiber optics, including wires that comprise the bus 1212. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1200. In various other embodiments of the present disclosure, a plurality of computer systems 1200 coupled by the communication link 1224 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
    accessing a first dataset corresponding to a first database identifier, wherein the first dataset includes a first data subset obtained from a first data source, but is missing one or more data items corresponding to a second data source;
    mapping, using a first machine learning model, the first data subset to a first position in a multi-dimensional space;
    selecting a second position that neighbors the first position in the multi-dimensional space, wherein the second position represents a mapping, using the first machine learning model, of a second data subset of a second dataset that corresponds to a second database identifier, wherein the second data subset is obtained from the first data source, and wherein the first machine learning model and a second machine learning model were trained together to reduce a distance between the second position and a third position mapped by the second machine learning model based on a third data subset corresponding to the second database identifier; and
    imputing, within the first dataset, the missing one or more data items with one or more substitute data items from the second dataset, wherein the one or more substitute data items are obtained from the second data source.

2. The system of claim 1, wherein the operations further comprise:
    analyzing a first entity corresponding to the first database identifier based on the first data subset and the one or more substitute data items; and
    classifying the first entity as a first classification among a plurality of classification based on the analyzing.

3. The system of claim 2, wherein the operations further comprise:
    receiving an electronic transaction request associated with the first entity; and
    authorizing or denying the electronic transaction request based on the first classification.

4. The system of claim 1, wherein the operations further comprise:
    mapping, using the first machine learning model, a plurality of data subsets that corresponds to a plurality of different database identifiers to corresponding positions in the multi-dimensional space, wherein the plurality of data subsets is obtained from the first data source;
    determining distances between the corresponding positions and the first position in the multi-dimensional space; and
    identifying, from the corresponding positions, a particular position having a shortest distance from the first position, wherein the particular position is selected as the second position based on the identifying.

5. The system of claim 1, wherein the operations further comprise:
    accessing a third dataset corresponding to a third database identifier, wherein the third dataset includes a fourth data subset obtained from the second data source, but is missing one or more second data items corresponding to the first data source;
    mapping, using the second machine learning model, the fourth data subset to a fourth position in the multi-dimensional space;
    selecting a fifth position that neighbors the fourth position in the multi-dimensional space, wherein the fifth position represents a mapping, using the second machine learning model, of a fifth data subset of a fourth dataset that corresponds to a fourth database identifier, wherein the fifth data subset is obtained from the second data source; and
    imputing, within the third dataset, the missing second one or more data items with one or more second substitute data items from the fourth dataset, wherein the one or more second substitute data items are obtained from the first data source.

6. The system of claim 5, wherein the operations further comprise:
    analyzing a third entity associated with the third database identifier based on the third data subset and the one or more substitute data items;
    receiving an electronic transaction request associated with the third entity; and
    authorizing or denying the electronic transaction request based on the analyzing of the third entity.

7. The system of claim 1, wherein each of the first machine learning model and the second machine learning model is configured to output a set of coordinates within the multi-dimensional space based on a set of input values.

8. A method, comprising:
    accessing, by a computer system, a first dataset associated with a first entity, wherein the first dataset includes a first data subset obtained from a first data source, but lacks one or more data items corresponding to a second data source;
    mapping, using a first machine learning model, the first data subset to a first position in a multi-dimensional space;
    selecting, by the computer system and among positions mapped by the first machine learning model, a second position that is closest to the first position in the multi-dimensional space, wherein the second position represents a mapping, using the first machine learning model, of a second data subset of a second dataset that corresponds to a second entity, wherein the second data subset is obtained from the first data source, and wherein the first machine learning model and a second machine learning model were trained together to reduce a distance between the second position and a third position mapped by the second machine learning model based on a third data subset corresponding to the second entity;
    determining one or more replacement data items for the first dataset based on a portion of the second dataset obtained from the second data source; and replacing, by the computer system and within the first dataset, the one or more data items with the one or more replacement data items.

9. The method of claim 8, wherein the first data subset and the one or more replacement data items comprise data corresponding to different attributes associated with the first entity.

10. The method of claim 8, wherein the first data subset comprises numerical data.

11. The method of claim 8, wherein the first data subset comprises multi-media data.

12. The method of claim 8, further comprising:
    training the first machine learning model and the second machine learning together to reduce the distance between the second position and the third position.

13. The method of claim 8, wherein the first entity is associated with a website, wherein the first data subset is associated with technologies used for implementing the website, and wherein the one or more replacement data items are associated with operation attributes of the website.

14. The method of claim 8, wherein the first entity is associated with a merchant, wherein the first data subset is associated with a description of a product offered for sale by the merchant, and wherein the one or more replacement items are associated with an image of the product.

15. The method of claim 8, further comprising:
    selecting, among the positions mapped by the first machine learning model, a fourth position that is second closest to the first position in the multi-dimensional space, wherein the fourth position represents a mapping, using the first machine learning model, of a third data subset of a third dataset that corresponds to a third entity, wherein the third data subset is obtained from the first data source, and wherein the one or more replacement data items is determined for the first dataset further based on a portion of the third dataset.

16. The method of claim 8, further comprising:
    determining a second distance between the second position and the first position in the multi-dimensional space, wherein the one or more replacement data items are determined further based on the second distance.

17. The method of claim 8, wherein the one or more replacement data items comprise multi-media items.

18. A non-transitory machine-readable medium having stored thereon machine-readable instructions executable to cause a machine to perform operations comprising:
    accessing a first dataset corresponding to a first database identifier within a database, wherein the first dataset comprises a first data subset obtained from a first data source and a second data subset obtained from a second data source;
    configuring a first machine learning model to map the first data subset to a first position in a multi-dimensional space;
    configuring a second machine learning model to map the second data subset to a second position in the multi-dimensional space;
    training the first machine learning model and the second machine learning model together to reduce a distance between the first position and the second position based on the first data subset and the second data subset both corresponding to the first database identifier; and
    imputing missing data items corresponding to a second database identifier using the trained first and second machine learning models.

19. The non-transitory machine-readable medium of claim 18, wherein the operations further comprise:
    accessing a second dataset corresponding to the second database identifier, wherein the second dataset includes a particular data subset obtained from the first data source;
    mapping, using the first machine learning model, the particular data subset to a particular position in the multi-dimensional space;
    determining that the first position is closest to the particular position in the multi-dimensional space among mapped positions that are mapped by the first machine learning model; and
    replacing, within the second dataset, the missing data items with one or more substitute data items from the first dataset, wherein the one or more substitute data items are obtained from the second data source.

20. The non-transitory machine-readable medium of claim 18, wherein the first data subset corresponds to a first set of attributes, and wherein the second data subset corresponds to a second set of attributes different from the first set of attributes.

* * * * *